(12) United States Patent
Roberts, III et al.

(10) Patent No.: US 8,333,340 B2
(45) Date of Patent: Dec. 18, 2012

(54) SYSTEM AND METHOD FOR REINFORCING A SUBSTRATE

(75) Inventors: Herbert Chidsey Roberts, III, Simpsonville, SC (US); Roger Matsumoto, Newark, DE (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/007,697

(22) Filed: Jan. 17, 2011

(65) Prior Publication Data

US 2012/0181370 A1     Jul. 19, 2012

(51) Int. Cl.
*B21C 47/02* (2006.01)
*B65H 81/06* (2006.01)

(52) U.S. Cl. .................. 242/445.1; 242/443; 242/448

(58) Field of Classification Search ............... 242/433.2, 242/433.4, 432.6, 437, 443, 445.1, 448, 432.5, 242/444.2
See application file for complete search history.

(56) References Cited

U.S. PATENT DOCUMENTS

| | | | |
|---|---|---|---|
| 3,939,612 A | | 2/1976 | Peterson |
| 4,232,496 A | | 11/1980 | Warkentin |
| 4,340,186 A | * | 7/1982 | Shimada et al. ........... 242/433.3 |
| 4,588,626 A | | 5/1986 | Cologna et al. |
| 5,649,398 A | | 7/1997 | Isley, Jr. et al. |
| 5,732,900 A | * | 3/1998 | Burch ........................ 242/432.5 |
| 5,794,884 A | * | 8/1998 | Dolgas et al. ............... 242/433.3 |
| 5,860,615 A | * | 1/1999 | Burch ........................ 242/432.5 |
| 6,290,166 B1 | * | 9/2001 | Aramaki et al. ........... 242/484.4 |
| 6,325,318 B1 | * | 12/2001 | Stratico et al. ............. 242/433.4 |
| 6,467,718 B2 | * | 10/2002 | Stratico et al. ............. 242/433.4 |
| 6,622,954 B2 | * | 9/2003 | Komuro et al. ............ 242/432.2 |
| 6,749,144 B2 | * | 6/2004 | Komuro et al. ............ 242/432.5 |
| 7,288,091 B2 | * | 10/2007 | Nesbitt ......................... 606/45 |
| 7,288,306 B2 | * | 10/2007 | Kersey ........................... 428/92 |

\* cited by examiner

*Primary Examiner* — Emmanuel M Marcelo
(74) *Attorney, Agent, or Firm* — Dority & Manning, P.A.

(57) ABSTRACT

A system for reinforcing a substrate includes a rotary device, a first guide connected to the rotary device, and a form positioned against the first guide. A reinforcement is supplied to wind around the form and against the first guide. A method for reinforcing a substrate includes connecting a first guide to a rotary device and positioning a form on a first side of the first guide. The method further includes winding a reinforcement around the form and against the first side of the first guide.

20 Claims, 2 Drawing Sheets

SYSTEM AND METHOD FOR REINFORCING A SUBSTRATE

FIELD OF THE INVENTION

The present invention generally involves a system and method for reinforcing a substrate. Particular embodiments of the present invention may produce a single or multi-layered spiral reinforced substrate with enhanced shear and/or tear characteristics.

BACKGROUND OF THE INVENTION

Various techniques are known in the art for increasing the strength and tear qualities of substrates. For example, a substrate such as a sheet, plate, shell, or similar geometry made from parallel plies of laminates may be susceptible to tearing along the parallel plies. As a result, an improved substrate may include alternating layers of cross-ply laminates, with each layer of laminates rotated approximately 90 degrees from adjacent layers. Although cross-ply laminates enhance the substrate's resistance to tearing parallel to each ply, cross-ply laminates may still have orthotropic properties in which the strength and stiffness of the substrate may be prematurely exceeded. In particular, cross-ply substrates having a hole or aperture through the substrate may be susceptible to tearing, shearing, or cracking around the perimeter of the hole or aperture. Therefore, an improved system and method for reinforcing a substrate would be useful.

BRIEF DESCRIPTION OF THE INVENTION

Aspects and advantages of the invention are set forth below in the following description, or may be obvious from the description, or may be learned through practice of the invention.

One embodiment of the present invention is a system for reinforcing a substrate. The system includes a rotary device, a first guide connected to the rotary device, and a form positioned against the first guide. A reinforcement is supplied to wind around the form and against the first guide.

Another embodiment of the present invention is a system for reinforcing a substrate. The system includes a rotary device, a plurality of guides connected to the rotary device, and a form between adjacent guides. A reinforcement is configured to wind around each form between adjacent guides and against at least one guide.

The present invention may also include a method for reinforcing a substrate. The method includes connecting a first guide to a rotary device and positioning a form on a first side of the first guide. The method further includes winding a reinforcement around the form and against the first side of the first guide.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
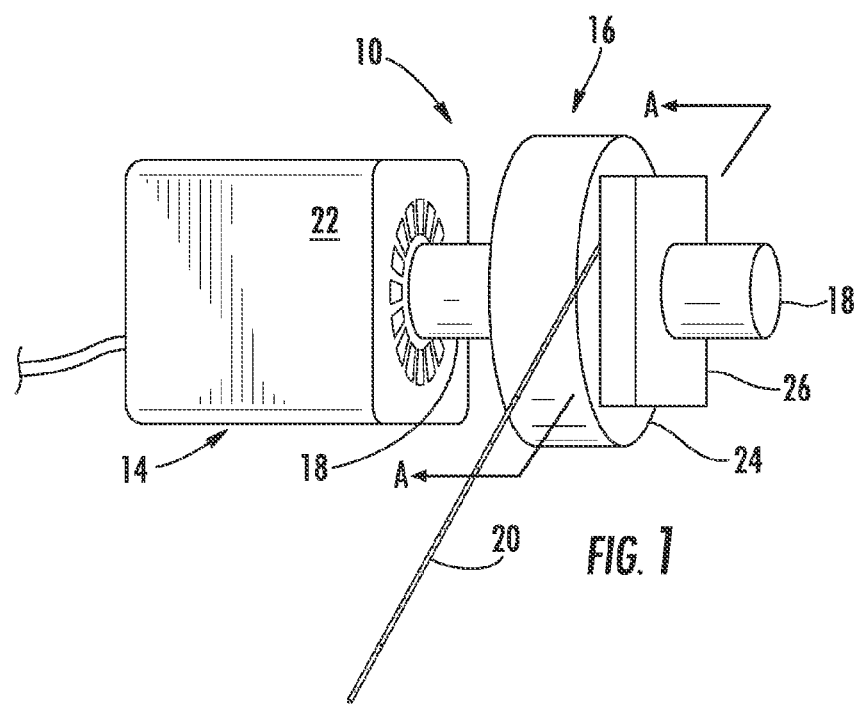
FIG. 1 is a perspective view of a system for reinforcing a substrate according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for reinforcing a substrate. The substrate may comprise any material or combination of materials desired to be reinforced. For example, the substrate may comprise a homogeneous or monolithic material, a composite material of cross-plies, and/or a laminated combination of homogeneous and composite materials. In particular embodiments, a reinforcement may be applied directly to one or both sides of the substrate. In other particular embodiments, the reinforcement may be separately formed and subsequently transferred to a particular location on the substrate needing strengthening. For example, the reinforcement may be aligned with an existing or contemplated hole or aperture through the substrate to enhance the shear and/or tear characteristics of the edges of the hole or aperture through the substrate.

Figure 2:
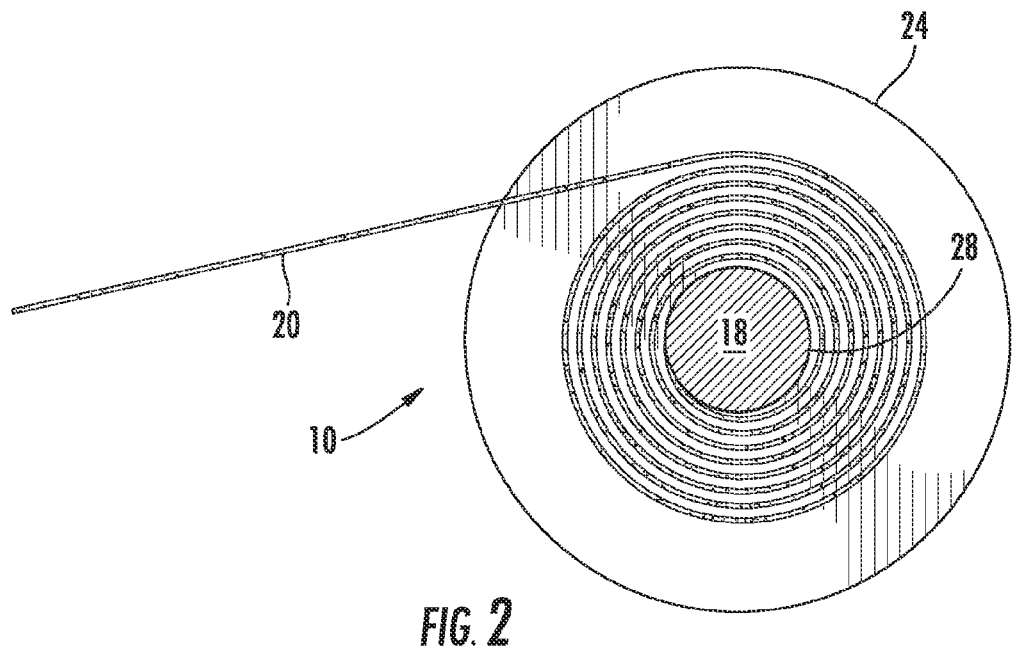
FIG. 2 is a plan view of the system shown in FIG. 1 taken along line A-A.

FIG. 1 provides a perspective view of a system 10 for reinforcing a substrate 12 according to one embodiment of the present invention, and FIG. 2 provides a plan view of the system 10 shown in FIG. 1 taken along line A-A. The system 10 generally includes a rotary device 14, one or more guides 16, one or more forms 18, and a reinforcement 20. The rotary device 14 may comprise any manual or automated device known to one of ordinary skill in the art for rotating one component with respect to another. For example, the rotary device 14 may comprise a manual hand crank, a ratchet and pawl assembly, a pulley assembly, or a pneumatic, hydraulic, or electric motor 22, as shown in FIG. 1.

The one or more guides 16 connect to the rotary device 14 and direct the distribution and/or placement of the reinforcement 20. The guide(s) 16 may comprise any size or shape of virtually any material. For example, the guide(s) 16 may comprise a circular disc 24 or a square sheet 26 as shown in FIG. 1. In particular embodiments, the guide(s) 16 may even comprise the particular substrate 12 to be reinforced. Alternately, or in addition, the substrate 12 may be applied to or fixed upon a surface of one or more of the guide(s) 16. In any event, the guide(s) 16 may be generally substantially parallel to one another and separated from one another according to the desired thickness of the reinforcement 20. For example, adjacent guides 16 may be separated from one another by less than approximately two times the thickness of the reinforcement 20. In this manner, the guides 16 may allow a single thickness or layer of the reinforcement 20 to fit between adjacent guides 16, thus limiting the final thickness of the reinforcement 20 applied to the substrate 12. One of ordinary skill in the art will readily appreciate that the distance between adjacent guides 16 may be varied according to the particular embodiment, as desired, and the distance between adjacent guides 16 is not a limitation of the present invention unless specifically recited in the claims.

The form 18 may be positioned against one or more of the guides 16 to provide a surface around which the reinforcement 20 is formed. For example, the form 18 may abut a surface of one or more of the guides 16, or the form 18 may be aligned with and/or extend through an aperture 28 or hole in one or more of the guides 16, as shown in FIG. 1. In particular embodiments, the form 18 may be positioned between adjacent guides 16 to also provide the desired spacing between the adjacent guides 16. Although illustrated as a generally cylindrical shape in each embodiment, the form 16 may comprise any size or shape, depending on the desired final size and shape of the reinforcement 20.

The reinforcement 20 is supplied to wind around the form 18 and against the guide 16. The reinforcement 20 may comprise any suitable material known to one of ordinary skill in the art for strengthening a substrate. For example, as shown in FIGS. 1 and 2, the reinforcement 20 may comprise a continuous, spunbond, or woven fiber or strand compatible with the underlying substrate 12. The diameter and stiffness of the reinforcement 20 will depend on the desired size and strength of the reinforcement 20. For example, in particular embodiments, individual fibers or strands in the reinforcement 20 may have a diameter on the order of approximately 6-10 mils and a stiffness of approximately 1 inch of droop per 4 inches of unsupported length. In addition, the reinforcement 20 may be dipped in or coated with a resin-based slurry formed of, for example, a polyvinylbutyral polymer binder. The resin-based slurry, if used, may be applied to the reinforcement 20 before or after the reinforcement 20 is wound around the form 18 or applied to the substrate 12. The resin-based slurry may include an adhesive capable of binding the reinforcement 20 to itself, the guides 16, and/or the substrate 12. If desired, the resin-based slurry may be volatile in the presence of heat, for example heat applied to the reinforcement 20 during a burn out or curing process.

Figure 3:
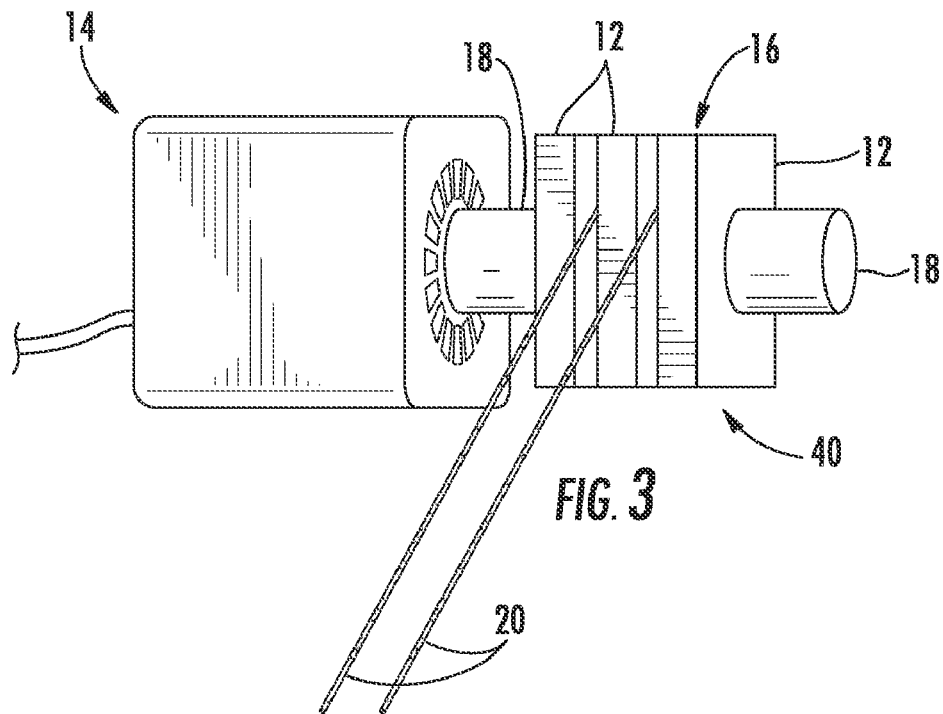
FIG. 3 is a perspective view of a system for reinforcing a substrate according to an alternate embodiment of the present invention.
Figure 4:
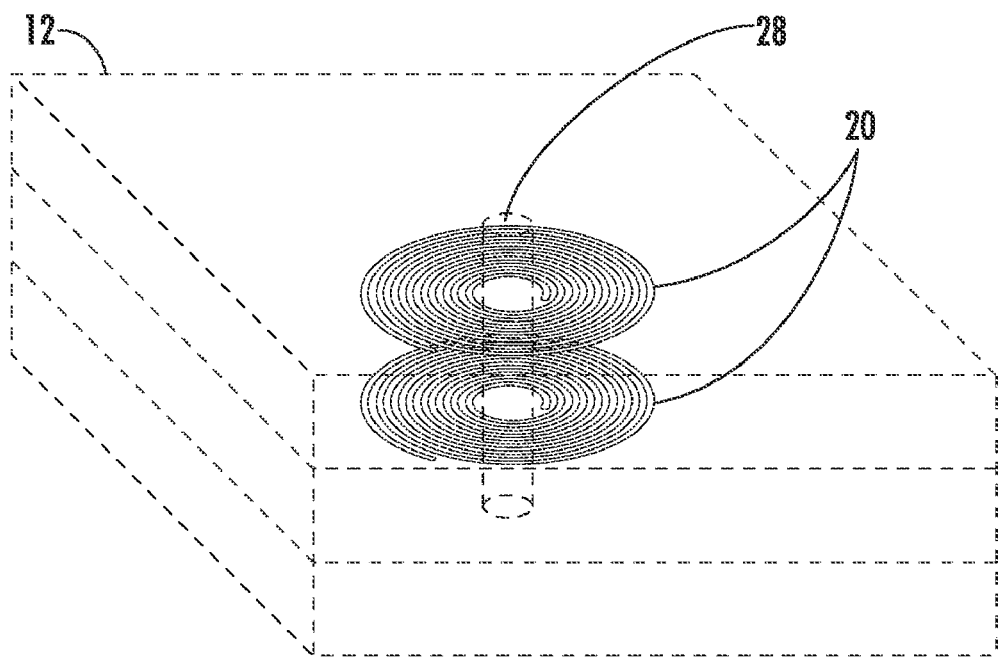
FIG. 4 is a perspective view of a product made by the system shown in FIG. 3.

FIG. 3 provides a perspective view of a system 40 for reinforcing a substrate 12 according to an alternate embodiment of the present invention, and FIG. 4 provides a perspective view of the reinforced substrate 12 made by the system 40 shown in FIG. 3. As shown in FIG. 3, the system 40 again includes the rotary device 14, guides 16, form 18, and reinforcement 20 as previously described with respect to the embodiment shown in FIGS. 1 and 2. Specifically, the guides 16 are connected to the rotary device 14, and the form 18 extends between and through adjacent guides 16. In this particular embodiment, the guides 16 comprise the substrate 12, and the reinforcement 20 is supplied between adjacent guides 16 or substrates 12 proximate to the existing aperture 28 in the guides 16 or substrate 12. As shown in FIG. 4, the final product comprises multiple layers of the substrate 12 with the reinforcement 20 located between adjacent substrates 12 to strengthen the perimeter around the aperture 28.

The embodiments previously described and illustrated with respect to FIGS. 1-4 may also provide a method for reinforcing the substrate 12. The method may include connecting one or more guide(s) 16 to the rotary device 14 and positioning the form 18 on, against, or through one or more of the guide(s) 16. Alternately, or in addition, the forms 18 may be positioned, aligned with, or inserted through an existing or anticipated aperture 28 in the guide(s) 16. The method may further include winding the reinforcement 20 around the form 18 and against the guide(s) 16, as shown in FIG. 1, or winding multiple reinforcements 20 around the form 18 and between adjacent guides 16, as shown in FIG. 3. Specifically, the rotary device 14 may rotate the form 18 and/or the guides 16 to pull the reinforcement 20 onto and around the form 18 as the guides 16 direct or control the placement of the reinforcement 20. The resulting reinforcement 20 is most clearly shown in FIGS. 2 and 4 as a spiral winding around the form 18 and/or aperture 28. In particular embodiments, such as in FIG. 3, the guides 16 may comprise the substrate 12 or the substrate 12 may be connected to or adhered to a surface of the guide(s) 16, in which case the spirally wound reinforcement 20 is applied directly to the substrate 12. Alternately, the spirally wound reinforcement 20 may be formed on or against the guide(s) 16 and subsequently removed from the guides 16 applied to the substrate 12, as desired.

Once the reinforcement 20 is wound around the form 18 and/or against or between the guides 16, the form 18 may be removed from the guide(s) 16, and the reinforcement 20 may be heat treated or cured as is known in the art. Alternately, or in addition, if desired, the form 18 may be positioned on an opposite side of the guides 16 or substrate 12, and the process may be repeated to apply the reinforcement 20 to the opposite side of the guides 16 or substrate 12. In either event, the guides 16 may be separated from one another by the desired thickness of the reinforcement 20. For example, the guides 16 may be separated by less than approximately 2 times a thickness of the reinforcement 20.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for reinforcing a substrate comprising:
   a. a rotary device;
   b. a first guide connected to said rotary device;
   c. a form positioned against said first guide; and
   d. a reinforcement wound around said form continuously against said first guide.

2. The system as in claim 1, wherein said form extends through said first guide.

3. The system as in claim 1, wherein said first guide comprises said substrate and said reinforcement is continuously connected to said substrate.

4. The system as in claim 1, further comprising a second guide, wherein said form is between said first guide and said second guide.

5. The system as in claim 4, wherein said first guide is substantially parallel to said second guide.

6. The system as in claim 4, wherein said first guide is separated from said second guide by less than approximately two times a thickness of said reinforcement.

7. The system as in claim 4, wherein said form extends through said second guide.

8. A system for reinforcing a substrate comprising:
a. a rotary device;
b. a plurality of guides connected to said rotary device;
c. a form between adjacent guides; and
d. a reinforcement wound around each form between adjacent guides and continuously against at least one guide.

9. The system as in claim 8, wherein said form extends through adjacent guides.

10. The system as in claim 8, wherein adjacent guides are separated by less than approximately two times a thickness of said reinforcement.

11. The system as in claim 8, wherein each of said plurality of guides comprises said substrate and said reinforcement is continuously connected to said substrate.

12. A method for reinforcing a substrate comprising:
a. connecting a first guide to a rotary device;
b. positioning a form on a first side of said first guide; and
c. winding a reinforcement around said form and continuously against said first side of said first guide.

13. The method as in claim 12, further comprising connecting the said substrate to said first guide.

14. The method as in claim 12, further comprising aligning said form with an aperture in said first guide.

15. The method as in claim 12, further comprising inserting said form through said first guide.

16. The method as in claim 12, further comprising removing said form from said first guide.

17. The method as in claim 12, further comprising positioning said form on a second side of said first guide and winding said reinforcement around said form and continuously against said second side of said first guide.

18. The method as in claim 12, further comprising removing said reinforcement from said first guide and applying said reinforcement to said substrate.

19. The method as in claim 12, further comprising winding said reinforcement between said first guide and a second guide.

20. The method as in claim 19, further comprising separating said first guide from said second guide by less than approximately two times a thickness of said reinforcement.

* * * * *